US011266060B2

(12) United States Patent
Schoeny et al.

(10) Patent No.: US 11,266,060 B2
(45) Date of Patent: Mar. 8, 2022

(54) SYSTEM AND METHOD FOR CONTROLLING THE OPERATION OF A SEED-PLANTING IMPLEMENT BASED ON COVER CROP DENSITY

(71) Applicant: CNH Industrial America LLC, New Holland, PA (US)

(72) Inventors: Christopher Schoeny, Minooka, IL (US); Chad M. Johnson, Arlington Heights, IL (US); Trevor Stanhope, Palos Hills, IL (US); Darian E. Landolt, Evanston, IL (US)

(73) Assignee: CNH Industrial America LLC, New Holland, PA (US)

( * ) Notice: Subject to any disclaimer, the term of this patent is extended or adjusted under 35 U.S.C. 154(b) by 225 days.

(21) Appl. No.: 16/433,645

(22) Filed: Jun. 6, 2019

(65) Prior Publication Data

US 2020/0383262 A1   Dec. 10, 2020

(51) Int. Cl.
*A01C 7/00* (2006.01)
*A01C 5/06* (2006.01)
(Continued)

(52) U.S. Cl.
CPC .............. *A01C 7/006* (2013.01); *A01B 63/24* (2013.01); *A01C 5/064* (2013.01); *A01C 5/068* (2013.01); *A01C 7/205* (2013.01); *A01C 14/00* (2013.01)

(58) Field of Classification Search
CPC ......... A01C 5/064; A01C 5/066; A01C 5/068; A01C 7/006; A01C 7/205; A01C 14/00
See application file for complete search history.

(56) References Cited

U.S. PATENT DOCUMENTS 5,995,895 A   11/1999   Watt et al.
6,393,927 B1   5/2002   Biggs et al.
(Continued)

FOREIGN PATENT DOCUMENTS

CN   108902088   11/2018
CN   109006749   12/2018
(Continued)

OTHER PUBLICATIONS

Yield Quest, "Planting Into Green Cover Crops", Feb. 13, 2018, Successful Farming (Year: 2018).*
(Continued)

Primary Examiner — Thomas B Will
Assistant Examiner — Ian A Normile
(74) Attorney, Agent, or Firm — Rebecca L. Henkel; Rickard K. DeMille

(57) ABSTRACT

In one aspect, a system for controlling the operation of a seed-planting implement may include a ground-engaging tool and an actuator configured to adjust an operating parameter of the ground-engaging tool. Furthermore, the system may include a controller configured to control the operation of the seed-planting implement such that a primary crop is planted in a field as the seed-planting implement is being moved across the field. Additionally, the controller may be configured to determine a density of a cover crop present within the field. Moreover, the controller may be configured to determine an adjustment to be made to the operating parameter of the ground-engaging tool based on the determined density. In addition, the controller may be configured to control the operation of the actuator to execute the adjustment of the operating parameter.

20 Claims, 5 Drawing Sheets

(51) Int. Cl.
  *A01B 63/24* (2006.01)
  *A01C 7/20* (2006.01)
  *A01C 14/00* (2006.01)

(56) References Cited

U.S. PATENT DOCUMENTS

| | | |
|---|---|---|
| 8,610,445 B2 | 12/2013 | Diekhans et al. |
| 8,887,824 B1 | 11/2014 | Johnson |
| 9,008,918 B2 | 4/2015 | Missotten |
| 9,423,249 B2 | 8/2016 | Deppermann et al. |
| 9,521,805 B2 | 12/2016 | Muench et al. |
| 9,740,208 B2 | 8/2017 | Sugumaran et al. |
| 9,961,833 B2 | 5/2018 | Halmann |
| 10,999,977 B2 * | 5/2021 | Maddux .............. A01C 21/007 |
| 2015/0305238 A1 | 10/2015 | Klausmann |
| 2016/0088786 A1 * | 3/2016 | Kornecki .............. A01C 7/006 111/158 |
| 2016/0134844 A1 * | 5/2016 | Casper .............. A01B 33/16 348/135 |
| 2017/0118915 A1 | 5/2017 | Middelberg |
| 2018/0242512 A1 * | 8/2018 | Beaujot .............. A01C 7/006 |
| 2019/0029165 A1 * | 1/2019 | Leimkuehler .......... A01B 63/32 |

FOREIGN PATENT DOCUMENTS

| | | | |
|---|---|---|---|
| DE | 2718303 A1 * | 10/1978 | ............ A01B 49/06 |
| DE | 102006014703 | 10/2007 | |
| EP | 2277376 | 1/2011 | |
| JP | 7170830 | 7/1995 | |

OTHER PUBLICATIONS

Gebbers, Robin, "Current Crop and Soil Sensors for Precision Agriculture," Leibniz—Institute for Agricultural Engineering Potsdam-Bornim, Germany, Sep. 16, 2014, 137 pages.

* cited by examiner

SYSTEM AND METHOD FOR CONTROLLING THE OPERATION OF A SEED-PLANTING IMPLEMENT BASED ON COVER CROP DENSITY

FIELD OF THE INVENTION

The present disclosure generally relates to seed-planting implements and, more particularly, to systems and methods for controlling the operation of a seed-planting based on the density of the cover crop present within the field across which the implement is being moved.

BACKGROUND OF THE INVENTION

In recent years, the use of cover crop in farming practices has grown dramatically. More specifically, shortly before or after the harvest of a primary or cash crop (e.g., corn, soybeans, and/or the like), many farmers plant cover crop (e.g., grasses, brassicas, legumes, and/or the like) within their fields. The presence of such cover crop helps manage erosion and improve nutrient retention in the soil of the field during the winter months.

Various no-till farming practices have also gained popularity in recent years. One type of no-till farming is called "planting green." In general, planting green refers to practice of planting a cash crop in the field in which living cover crop is present. The no-till nature of planting green and the presence of the living cover crop makes it difficult for seed-planting implements (e.g., seeders, planters, and/or the like) to maintain proper planting depth and/or seed-to-soil contact. Moreover, such issues are exacerbated as the density or amount of cover crop present within the field varies.

Accordingly, an improved system and method for controlling the operation of a seed-planting implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for controlling the operation of a seed-planting implement. The system may include a ground-engaging tool configured to contact soil present within a field across which the seed-planting implement is being moved. The system may also include an actuator configured to adjust an operating parameter of the ground-engaging tool. Furthermore, the system may include a controller configured to control the operation of the seed-planting implement such that a primary crop is planted in a field as the seed-planting implement is being moved across the field. Additionally, the controller may be configured to determine a density of a cover crop present within the field. Moreover, the controller may be configured to determine an adjustment to be made to the operating parameter of the ground-engaging tool based on the determined density. In addition, the controller may be configured to control the operation of the actuator to execute the adjustment of the operating parameter.

In another aspect, the present subject matter is directed to a method for controlling the operation of a seed-planting implement. The seed-planting implement may include a ground-engaging tool and an actuator configured to adjust an operating parameter of a ground-engaging tool. The method may include controlling, with one or more computing devices, the operation of the seed-planting implement such that a primary crop is planted in a field as the seed-planting implement is being moved across the field. Additionally, the method may include determining, with one or more the computing devices, a density of a cover crop present within the field. Furthermore, the method may include determining, with the one or more computing devices, an adjustment to be made to the operating parameter of the ground-engaging tool based on the determined density. Moreover, the method may include controlling, with the one or more computing devices, the operation of the actuator to execute the adjustment of the operating parameter.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

DETAILED DESCRIPTION OF THE DRAWINGS

Figure 1:
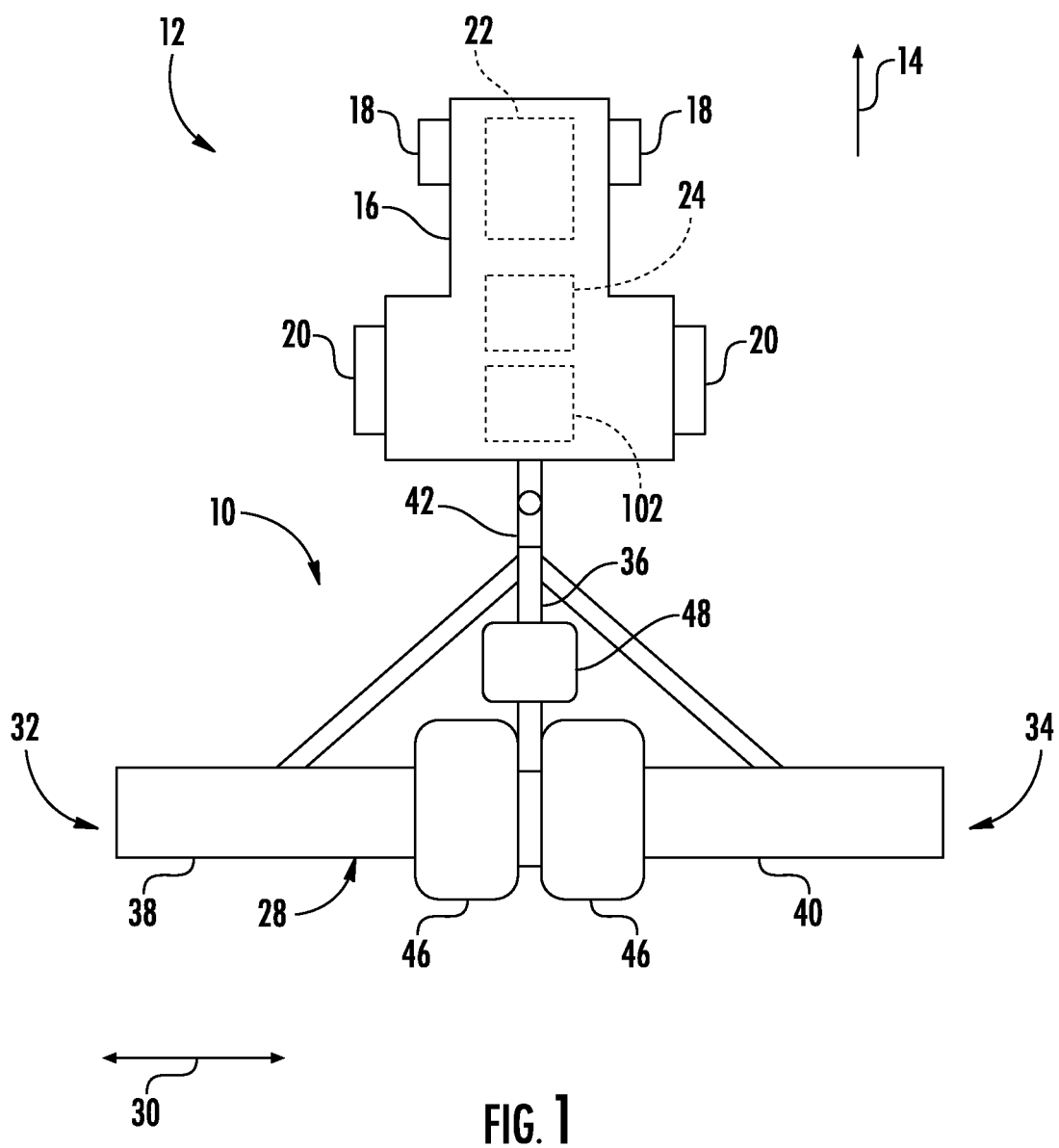
FIG. 1 illustrates a top view of one embodiment of a seed-planting implement coupled to a work vehicle in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for controlling the operation of a seed-planting implement. Specifically, in several embodiments, as the seed-planting implement is being moved across a field in which cover crop is present, a controller of the disclosed system may be configured to control the operation of the implement such that a primary or cash crop (e.g., corn, soybeans, and/or the like) is planted in the field. Furthermore, as the seed-planting implement is being moved across the field, the controller may be configured to determine the density of the cover crop present within the field. For example, in one embodiment, the controller may be configured to determine the density of the cover crop based on field map that is stored in its memory or in a remote server database. In another embodiment, the controller may be configured to determine the density of the cover crop based on data received from one or more sensors (e.g., a vision-based sensor(s)) mounted on the implement and/or an associated work vehicle.

In accordance with aspects of the present subject matter, the controller may be configured to control the operation of one or more ground-engaging tools of the seed-planting implement based on the determined cover crop density. More specifically, the controller be configured to may determine an adjustment(s) to be made to one or more operating parameters of the ground-engaging tool(s) based on the determined cover crop density. For example, such adjustments may include adjusting the force being applied to a gauge wheel(s) of the seed-planting implement, the force being applied a closing disc(s)/wheel(s) of the implement, and/or the force being applied to and/or the position(s) of a row cleaning device(s) of the implement. Thereafter, the controller may be configured to control the operation of one or more actuator(s) of the seed-planting implement to execute the determined operating parameter adjustment(s).

Figure 2:
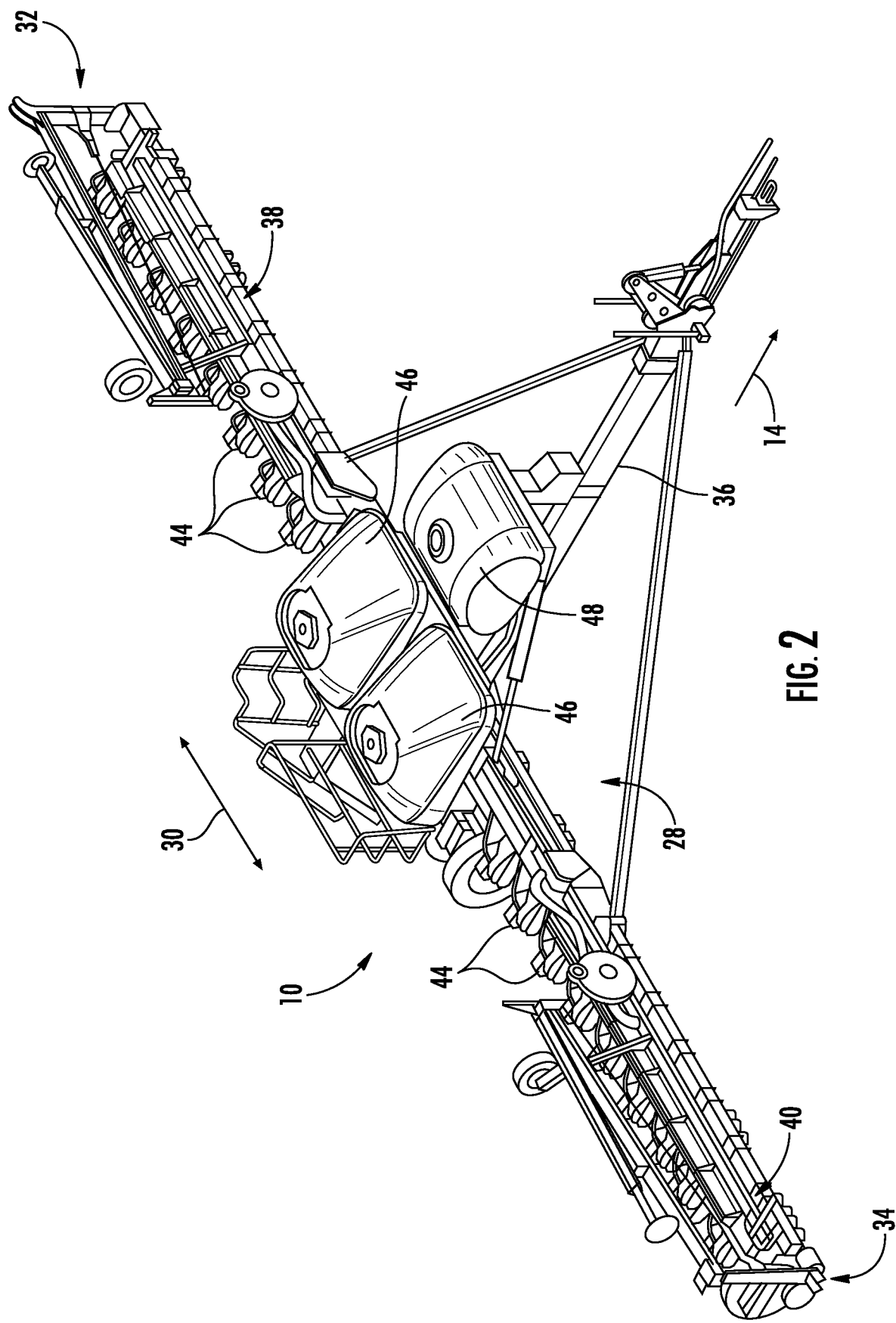
FIG. 2 illustrates a perspective view of the seed-planting implement shown in FIG. 1, particularly illustrating various components of the implement.

Referring now to the drawings, FIGS. 1 and 2 illustrate differing views of one embodiment of a seed-planting implement 10 in accordance with aspects of the present subject matter. Specifically, FIG. 1 illustrates a top view of the seed-planting implement 10 coupled to a work vehicle 12. Additionally, FIG. 2 illustrates a perspective view of the implement 10, particularly illustrating various components of the implement 10.

In general, the vehicle 12 may be configured to tow the seed-planting implement 10 across a field in a direction of travel (e.g., as indicated by arrow 14 in FIG. 1). As shown, in the illustrated embodiment, the implement 10 is configured as a seeder (e.g., a disc drill), and the vehicle 12 is configured as an agricultural tractor. However, in alternative embodiments, the implement 10 may be configured as any other suitable type of seed-planting implement, such as a planter or another seed-dispensing implement, a side-dresser or another fertilizer-dispensing implement, a strip tiller, and/or the like. Similarly, the vehicle 12 may be configured as any other suitable type of vehicle, such as an agricultural harvester, a self-propelled sprayer, and/or the like.

As shown in FIG. 1, the vehicle 12 may include a frame or chassis 16 configured to support or couple to a plurality of components. For example, a pair of steerable front wheels 18 and a pair of driven rear wheels 20 may be coupled to the frame 16. The wheels 18, 20 may be configured to support the vehicle 12 relative to the ground and move the vehicle 12 in the direction of travel 14 across the field. However, in alternative embodiments, the front wheels 18 may be driven in addition to or in lieu of the rear wheels 20. Additionally, in further embodiments, the vehicle 12 may include track assemblies (not shown) in place of the front and/or rear wheels 18, 20.

Furthermore, the vehicle 12 may include one or more devices for adjusting the speed at which the vehicle 12 moves across the field in the direction of travel 14. Specifically, in several embodiments, the work vehicle 12 may include an engine 22 and a transmission 24 mounted on the frame 16. In general, the engine 22 may be configured to generate power by combusting or otherwise burning a mixture of air and fuel. The transmission 24 may, in turn, be operably coupled to the engine 22 and may provide variably adjusted gear ratios for transferring the power generated by the engine 22 to the driven wheels 20. For example, increasing the power output by the engine 22 (e.g., by increasing the fuel flow to the engine 22) and/or shifting the transmission 24 into a higher gear may increase the speed at which the vehicle 12 moves across the field. Conversely, decreasing the power output by the engine 22 (e.g., by decreasing the fuel flow to the engine 22) and/or shifting the transmission 24 into a lower gear may decrease the speed at which the vehicle 12 moves across the field.

Moreover, as shown in FIG. 1, a location sensor 102 may be provided in operative association with the implement 10 and/or the vehicle 12. For instance, as shown in FIG. 1, the location sensor 102 is installed on or within the vehicle 12. However, in other embodiments, the location sensor 102 may be installed on or within the implement 10. In general, the location sensor 102 may be configured to determine the location of the implement 10 and/or the vehicle 12 using a satellite navigation positioning system (e.g. a GPS system, a Galileo positioning system, the Global Navigation satellite system (GLONASS), the BeiDou Satellite Navigation and Positioning system, and/or the like). In such an embodiment, the location determined by the location sensor 102 may be transmitted to a controller(s) of the implement 10 and/or the vehicle 12 (e.g., in the form coordinates) and stored within the controller's memory for subsequent processing and/or analysis. For instance, based on the known dimensional configuration and/or relative positioning between the implement 10 and the vehicle 12, the determined location from the location sensor 102 may be used to geo-locate the implement 10 within the field.

Referring still to FIGS. 1 and 2, the implement 10 may include a frame or toolbar 28 configured to support and/or couple to one or more components of the implement 10. Specifically, in several embodiments, the toolbar 28 may extend along a lateral direction 30 between a first side 32 of the implement 10 and a second side 34 of the implement 10. As shown, the toolbar 28 may include a center section 36 and a pair of wing sections 38, 40. In one embodiment, the wing sections 38, 40 may be pivotably coupled to the center section 36 in a manner that permits the wing sections 38, 40 to fold forward to reduce the lateral width of the implement 10, such as during storage or transportation of the implement 10 on a road. Furthermore, a tow bar 42 may be coupled to the center section 36 to allow the implement 10 to be towed by the work vehicle 12. Additionally, as shown in FIG. 2, the wing sections 38, 40 may generally be configured to support a plurality of row units (or seed-planting units) 44. As will be described below, each row unit 44 may be configured to deposit seeds (e.g., cash crop seeds) at a desired depth beneath the soil surface and at a desired seed spacing as the implement 10 is being towed by the vehicle 12, thereby establishing rows of planted seeds. In some embodiments, the bulk of the seeds to be planted may be stored in one or more hoppers or seed tanks 46 mounted on or otherwise supported by the toolbar 28. Thus, as seeds are planted by the row units 44, a pneumatic distribution system (not shown) may distribute additional seeds from the seed tanks 46 to the individual row units 44. Additionally, one or more fluid tanks 48 mounted on or otherwise supported by the toolbar 28 may store agricultural fluids, such as insecticides, herbicides, fungicides, fertilizers, and/or the like, which may be sprayed onto the seeds during planting.

It should be appreciated that, for purposes of illustration, only a portion of the row units 44 of the implement 10 have been shown in FIG. 2. In general, the implement 10 may include any number of row units 44, such as six, eight, twelve, sixteen, twenty-four, thirty-two, or thirty-six row units 44. In addition, it should be appreciated that the lateral spacing between row units 44 may be selected based on the type of crop being planted. For example, the row units 44 may be spaced approximately thirty inches from one another for planting corn, and approximately fifteen inches from one another for planting soybeans.

Figure 3:
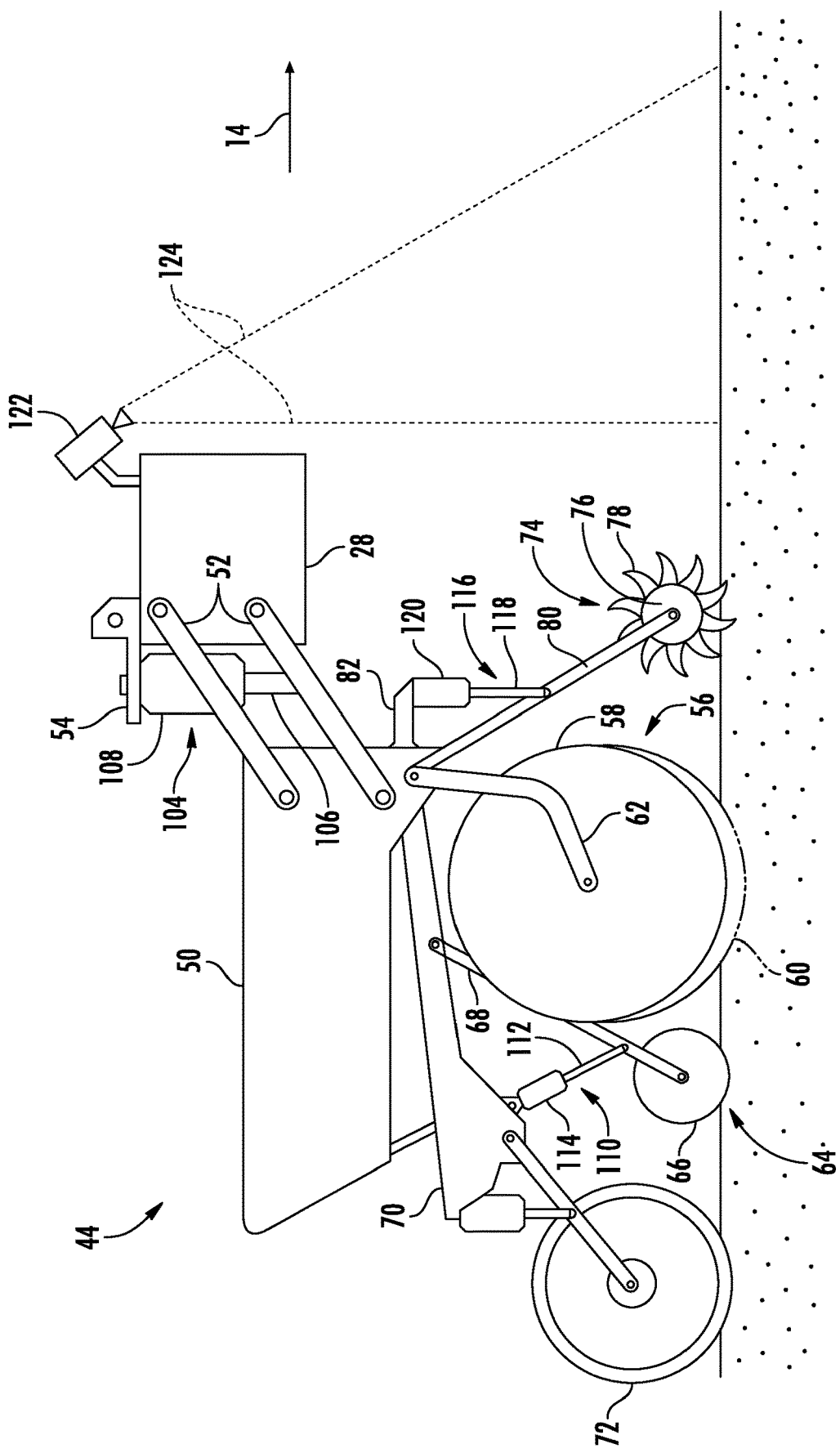
FIG. 3 illustrates a side view of one embodiment of a row unit of a seed-planting implement in accordance with aspects of the present subject matter.

Referring now to FIG. 3, a side view of one embodiment of a row unit 44 is illustrated in accordance with aspects of the present subject matter. As shown, the row unit 44 may include a frame 50 adjustably coupled to the toolbar 28 by links 52. For example, one end of each link 52 may be pivotably coupled to the frame 50, while an opposed end of each link 52 may be pivotably coupled to the toolbar 28. In one embodiment, the links 52 may be parallel. However, in alternative embodiments, the row unit 44 may be coupled to the toolbar 28 in any other suitable manner.

As shown in FIG. 3, the row unit 44 may include a row unit actuator 104 configured to move or otherwise adjust the position of the row unit 44 relative to the toolbar 28 and/or apply a force to the row unit 44. For example, as shown, in the one embodiment, a first end of the actuator 104 (e.g., a rod 106 of the actuator 104) may be coupled to the one of the links 52, while a second end of the actuator 104 (e.g., the cylinder 108 of the actuator 104) may be coupled to a bracket 54, which is, in turn, coupled to the toolbar 28. The rod 106 of the actuator 104 may be configured to extend and/or retract relative to the cylinder 108 to adjust the position of the row unit 44 relative to the toolbar 28. Furthermore, the actuator 104 may be configured to apply a force to the row unit 44, which may, in turn, cause the various components of the row unit 44 (e.g., its gauge wheel) to exert a pressure on the soil. In the illustrated embodiment, the actuator 104 corresponds to a fluid-driven actuator, such as hydraulic or pneumatic cylinder. However, in alternative embodiments, the actuator 104 may correspond to any other suitable type of actuator, such as an electric linear actuator.

In several embodiments, the row unit 44 may include a furrow-opening assembly 56. For example, in one embodiment, the furrow-opening assembly 56 may include a gauge wheel 58 and one or more disc openers 60 configured to excavate a furrow or trench in the soil. In general, the gauge wheel 58 may be configured to engage the top surface of the soil as the implement 10 is moved across the field. As such, the height of the gauge wheel 58 may be adjusted relative to the disc opener(s) 60, which is fixed to the frame 50, to set the desired depth of the furrow being excavated. Furthermore, the furrow-opening assembly 56 may include a support arm 62 configured to adjustably couple the gauge wheel 58 to the frame 50. For example, one end of the support arm 62 may be coupled to the gauge wheel 58, while an opposed end of the support arm 62 may be coupled to the frame 50. Additionally, the disc opener(s) 60 may be coupled (e.g., bolted) to the frame 50. However, in alternative embodiments, the gauge wheel 58 and the disc opener(s) 60 may be coupled to the frame 50 in any other suitable manner. Furthermore, the furrow-opening assembly 56 may include any other suitable type of furrow-forming tool, such as a hoe(s), a winged shank opener(s) having a ski, and/or the like.

Moreover, as shown, the row unit 44 may include a furrow-closing assembly 64. Specifically, in several embodiments, the furrow-closing assembly 64 may include a pair of closing discs 66 (only one is shown in FIG. 3) positioned relative to each other in a manner that permits soil to flow between the discs 66 as the implement 10 is moved across the field. As such, the closing discs 66 may be configured to penetrate the soil in a manner that collapses the furrow, thereby closing the furrow after seeds have been deposited therein. Furthermore, the furrow-closing assembly 64 may include a support arm 68 configured to adjustably couple the closing discs 66 to the frame assembly 50. For example, one end of the support arm 68 may be pivotably coupled to the closing discs 66, while an opposed end of the support arm 68 may be pivotably coupled to the chassis arm 70, which is, in turn, coupled to the frame 50. However, in alternative embodiments, the closing discs 66 may be coupled to the frame 50 in any other suitable manner. Furthermore, in alternative embodiments, the furrow-closing assembly 64 may include any other suitable number of closing discs 66, such as one closing disc 66 or three or more closing discs 66. Additionally, the row unit 44 may include a press wheel 72 configured to roll over the closed furrow to firm the soil over the seed and promote favorable seed-to-soil contact.

Additionally, a furrow-closing assembly actuator 110 may be configured to move or otherwise adjust the position of the closing discs 66 relative to the frame 50 and/or apply a force to the closing discs 66. For example, as shown, in one embodiment, a first end of the actuator 110 (e.g., a rod 112 of the actuator 110) may be coupled to the support arm 68 of the furrow-closing assembly 64, while a second end of the actuator 110 (e.g., the cylinder 114 of the actuator 110) may be coupled to the chassis arm 70, which is, in turn, coupled to the frame 50. The rod 112 of the actuator 110 may be configured to extend and/or retract relative to the cylinder 114 to adjust the position of the closing discs 66 relative to the frame 50. Furthermore, the actuator 110 may be configured to apply a force to the closing discs 66, which may, in turn, cause the closing discs 66 to penetrate the soil. For example, the actuator 110 may increase the penetration depth of the closing discs 66 by increasing the force applied thereto. Conversely, the actuator 110 may reduce the penetration depth of the closing discs 66 by decreasing the force applied thereto. In the illustrated embodiment, the actuator 110 corresponds to a fluid-driven actuator, such as hydraulic or pneumatic cylinder. However, in alternative embodiments, the actuator 110 may correspond to any other suitable type of actuator, such as an electric linear actuator.

Furthermore, a row-cleaning device 74 may be positioned at the forward end of the row unit 44 relative to the direction of travel 14. In this regard, the row-cleaning device 74 may be configured to break up and/or sweep away residue, dirt clods, and/or the like from the path of the row unit 44 before the furrow is formed in the soil. For example, in one embodiment, the row-cleaning device 74 may include one or more row-cleaning wheels 76, with each wheel 76 having a plurality of tillage points or fingers 78. As such, the wheel(s) 76 may be configured to roll relative to the soil as the implement 10 is moved across the field such that the fingers 78 break up and/or sweep away residue and dirt clods. Additionally, the row-cleaning device 72 may include a support arm 80 configured to adjustably couple the row-cleaning wheel(s) 76 to the frame 50. For example, one end of the support arm 80 may be pivotably coupled to the wheel(s) 76, while an opposed end of the support arm 80 may be pivotably coupled to a bracket 82, which is, in turn, coupled to the frame 50. However, in alternative embodiments, the row-cleaning wheel(s) 76 may be coupled to the frame 50 in any other suitable manner. Furthermore, although only one row-cleaning wheel 76 is shown in FIG. 3, it should be appreciated that, in alternative embodiments, the row-cleaning device 74 may include any other suitable number of row-cleaning wheels 76. For example, in one embodiment, the row-cleaning device 74 may include a pair of row-cleaning wheels 76.

In several embodiments, a row-cleaning device actuator 116 may be configured to move or otherwise adjust the position of the row-cleaning device 74 relative to the frame 50 and/or apply a force to the row-cleaning device 74. For example, as shown, in one embodiment, a first end of the actuator 116 (e.g., a rod 118 of the actuator 116) may be coupled to the support arm 80 of the row-cleaning device 74, while a second end of the actuator 116 (e.g., the cylinder 120 of the actuator 116) may be coupled to a bracket 82, which is, in turn, coupled to the frame 50. The rod 118 of the actuator 116 may be configured to extend and/or retract relative to the cylinder 120 to adjust the position of the row-cleaning device 74 relative to the frame 50. Furthermore, the actuator 116 may be configured to apply a force to the row-cleaning device 74, which may, in turn, cause the device 74 to exert a pressure on the soil. In general, increasing the force applied to the row-cleaning wheel(s) 76 may increase the pressure applied to the soil by the row-cleaning device 74, thereby increasing the aggressiveness with which the wheel(s) 76 breaks up and sweeps away the residue and/or dirt clods. Conversely, decreasing the force applied to the row-cleaning wheel(s) 76 may decrease the pressure applied to the soil by the row-cleaning device 74, thereby decreasing the aggressiveness with which the wheel(s) 76 breaks up and sweeps away the residue and/or dirt clods. In the illustrated embodiment, the actuator 116 corresponds to a fluid-driven actuator, such as hydraulic or pneumatic cylinder. However, in alternative embodiments, the actuator 116 may correspond to any other suitable type of actuator, such as an electric linear actuator.

In addition, the seed-planting implement 10 and/or the work vehicle 12 may include one or more cover crop density sensors 122 coupled thereto and/or supported thereon for detecting the density of the cover crop present within the field across which the implement/vehicle 10/12 is traveling. Specifically, in several embodiments, the cover crop density sensor(s) 122 may be provided in operative association with the implement 10 and/or the vehicle 12 such that the sensor(s) 122 has a field of view or sensor detection range directed towards a portion(s) of the field forward of the implement 10. In this regard, the cover crop density sensor(s) 122 may be used to capture data associated with the density of the cover crop present within the field as the implement/vehicle 10/12 travels across the field during the performance of a seed-planting operation. As will be described below, by analyzing the data captured by the cover crop density sensor(s) 122, an associated controller may then be configured to determine the density of the cover crop present within in the field. Based on the determined density, the controller may, for example, control/adjust the operation of the implement 10 and/or the vehicle 12, as necessary, to ensure proper planting depth and/or seed-to-soil contact.

In general, the cover crop density sensor(s) 122 may correspond to any suitable sensing device(s) that is configured to detect or capture data indicative of the density of the cover crop present within the field. For instance, in several embodiments, the cover crop density sensor(s) 122 may correspond to a suitable as a vision-based sensor(s), such as a camera(s) configured to capture three-dimensional images of the cover crop present within the field, thereby allowing the cover crop density to be calculated or estimated by analyzing the content of each image. For instance, in a particular embodiment, the field cover crop density sensor(s) 122 may correspond to a stereographic camera(s) having two or more lenses with a separate image sensor for each lens to allow the camera(s) to capture stereographic or three-dimensional images. In a further embodiment, the cover crop density sensor(s) 122 may correspond to any other suitable sensing device(s) configured to detect or capture cover crop density data, such as a radio detection and ranging (RADAR) sensor(s) or a light detection and ranging (LIDAR) sensor(s).

It should be appreciated that the cover crop density sensor(s) 122 may be mounted on or otherwise installed on the implement 10 and/or the vehicle 12 at any suitable location(s). For example, as shown in FIG. 3, in one embodiment, a cover crop density sensor 122 may be installed on the toolbar 28 of the implement 10 such that the sensor 122 has a field of view (e.g., as indicated by dashed lines 124 in FIG. 3) directed towards a portion of the field forward of the implement 10 relative to the direction of travel 14. As such, the cover crop density sensor 122 may be configured to capture data indicative of the density of the cover crop within a portion of the field forward of the implement 10. In another embodiment, a cover crop density sensor 122 may be installed on the vehicle 12 (e.g., in addition to or as an alternative to the implement 10) such that its field of view 124 is directed towards a portion of the field forward of the vehicle 12 and the implement 10 or aft of the vehicle 12 and forward of the implement 10. Moreover, it should be appreciated that, although FIG. 3 illustrates one cover crop density sensor 122 installed on the implement 10, any other suitable number of sensors 122 may be installed the implement 10 and/or vehicle 12, such as two or more sensors 122.

It should be further appreciated that the configuration of the seed-planting implement 10 and the work vehicle 12 described above and shown in FIGS. 1-3 is provided only to place the present subject matter in an exemplary field of use. Thus, it should be appreciated that the present subject matter may be readily adaptable to any manner of implement and/or vehicle configuration.

Figure 4:
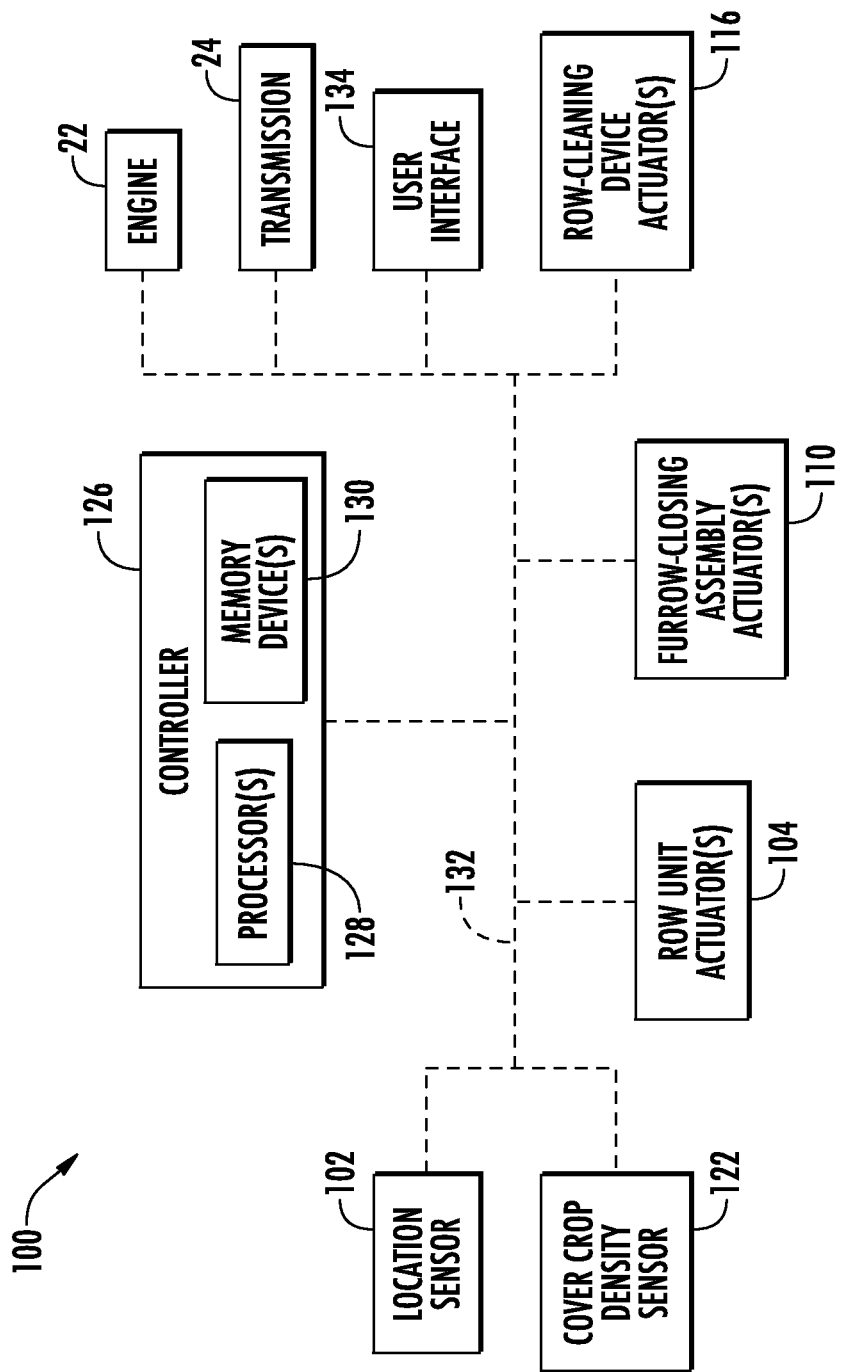
FIG. 4 illustrates a schematic view of one embodiment of a system for controlling the operation of a seed-planting implement in accordance with aspects of the present subject matter.

Referring now to FIG. 4, a schematic view of one embodiment of a system 100 for controlling the operation of a seed-planting implement is illustrated in accordance with aspects of the present subject matter. In general, the system 100 will be described herein with reference to the seed-planting implement 10 and the work vehicle 12 described above with reference to FIGS. 1-3. However, it should be appreciated by those of ordinary skill in the art that the disclosed system 100 may generally be utilized with seed-planting implements having any other suitable implement configuration and/or work vehicles having any other suitable vehicle configuration.

As shown in FIG. 4, the system 100 may include a controller 126 positioned on and/or within or otherwise associated with the implement 10 or the vehicle 12. In general, the controller 126 may comprise any suitable processor-based device known in the art, such as a computing device or any suitable combination of computing devices. Thus, in several embodiments, the controller 126 may include one or more processor(s) 128 and associated memory device(s) 130 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 130 of the controller 126 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 130 may generally be configured to store suitable computer-readable instructions that, when implemented by the processor(s) 128, configure the controller 126 to perform various computer-implemented functions.

In addition, the controller 126 may also include various other suitable components, such as a communications circuit or module, a network interface, one or more input/output channels, a data/control bus and/or the like, to allow controller 126 to be communicatively coupled to any of the various other system components described herein (e.g., the engine 22; the transmission 24; the sensors 102, 122; and/or the actuators 104, 110, 116). For instance, as shown in FIG. 4, a communicative link or interface 132 (e.g., a data bus) may be provided between the controller 126 and the components 22, 24, 102, 104, 110, 116, 122 to allow the controller 126 to communicate with such components 22, 24, 102, 104, 110, 116, 122 via any suitable communications protocol (e.g., CANBUS).

It should be appreciated that the controller 126 may correspond to an existing controller(s) of the implement 10 and/or the vehicle 12, itself, or the controller 126 may correspond to a separate processing device. For instance, in one embodiment, the controller 126 may form all or part of a separate plug-in module that may be installed in association with the implement 10 and/or the vehicle 12 to allow for the disclosed systems to be implemented without requiring additional software to be uploaded onto existing control devices of the implement 10 and/or the vehicle 12. It should also be appreciated that the functions of the controller 126 may be performed by a single processor-based device or may be distributed across any number of processor-based devices, in which instance such devices may be considered to form part of the controller 126. For instance, the functions of the controller 126 may be distributed across multiple application-specific controllers, such as a navigation controller, an engine controller, an implement controller, and/or the like.

Furthermore, in one embodiment, the system 100 may also include a user interface 134. More specifically, the user interface 134 may be configured to provide feedback (e.g., feedback with the cover crop density) to the operator of the implement/vehicle 10/12. As such, the user interface 134 may include one or more feedback devices (not shown), such as display screens, speakers, warning lights, and/or the like, which are configured to provide feedback from the controller 126 to the operator. The user interface 134 may, in turn, be communicatively coupled to the controller 126 via the communicative link 132 to permit the feedback to be transmitted from the controller 126 to the user interface 134. In addition, some embodiments of the user interface 134 may include one or more input devices (not shown), such as touchscreens, keypads, touchpads, knobs, buttons, sliders, switches, mice, microphones, and/or the like, which are configured to receive user inputs from the operator. In one embodiment, the user interface 134 may be mounted or otherwise positioned within a cab (not shown) of the vehicle 12. However, in alternative embodiments, the user interface 134 may mounted at any other suitable location.

In several embodiments, the controller 126 may be configured to control the operation of a seed-planting implement such that a primary crop is planted in a field as the implement is being moved across the field. As described above, in certain instances, a primary or cash crop (e.g., corn, soybeans, and/or the like) may be planted in a field in which a cover crop (e.g., grasses, brassicas, legumes, and/or the like) is present. As such, the controller 126 may be configured to control one or more components (e.g., one or more actuators) of the seed-planting implement 10 such that the cash crop is planted in the field as the implement/vehicle 10/12 travels across the field. For example, in one embodiment, the controller 126 may be configured to control the implement 10 such that the implement 10 forms one or more furrows within the field (e.g., via the disc opener(s) 60 or other furrow-forming tool(s) of the implement 10), deposits cash crop seeds into the furrow(s) (e.g., via one or more seed meters or other seed dispensing devices of the implement 10), and closes the furrow(s) (e.g., via the closing discs 66 or other furrow-closing tool(s) of the implement 10).

Additionally, the controller 126 may be configured to determine the density of a cover crop present within the field across which the implement is being moved. As mentioned above, a cover crop may be present within the field when the implement 10 is planting the cash crop. In several embodiments, the cover crop may be living when the implement 10 is operated to plant the cash crop. As such, variations in the density of the cover crop across the field may necessitate adjustment(s) to one or more operating parameters of the implement 10 to maintain proper furrow depth and/or seed-to-soil contact when planting the cash crop. In this regard, and as will be described below, the controller 126 may be configured to actively adjust an operating parameter(s) of one or more ground-engaging tool(s) (e.g., the disc opener(s) 60 or other furrow-forming tool(s), the closing discs 66 or other furrow-closing tool(s), the row-cleaning device(s) 74) based on the determined cover crop density.

It should be appreciated the determined density of the cover crop may correspond to any suitable parameter indicative of the amount and/or volume of the cover crop present within a given unit of area of the field. For example, the determined cover crop density may correspond to the number of cover crop plants present within a given area of the field (e.g., the number of cover crop plants per square meter). In another embodiment, the determined cover crop density may correspond to the amount of cover crop biomass (e.g., the size/volume of the cover crop plants) present within a given area of the field (e.g., the amount of cover crop biomass per square meter). However, in alternative embodiments, the determined density of the cover crop may correspond to any suitable parameter.

Moreover, in several embodiments, the controller 126 may be configured to determine the density of the cover crop based on a field map. In general, the field map may be stored within its memory 130 and/or on a remote database server (not shown) and include geo-referenced data that is indicative of the density of the cover crop present within the field at such locations. For example, the geo-referenced cover crop density data used to create the field map may be collected during a previously-performed agricultural operation (e.g., a fertilizing operation, a harvesting operation, and/or the like). In this regard, as the implement/vehicle 10/12 travels across the field, the controller 126 may be configured to geo-locate the implement 10 within the field based on the data (e.g., coordinates) received from the location sensor 102 (e.g., via the communicative link 132). Thereafter, the controller 126 may be configured to access the field map from its memory 130 and/or the remote database server (e.g., via Wi-Fi, 3G, 4G, LTE, and/or the like) to determine the cover crop density at its current location within the field.

It should be appreciated that, as used herein, a "field map" may generally correspond to any suitable dataset that correlates data to various locations within a field. Thus, for example, a field map may simply correspond to a data table that correlates the density(ies) of the cover crop present within the field to various locations within the field. Alternatively, a field map may correspond to a more complex data structure, such as a geospatial numerical model that can be used to identify variations in the density(ies) of the cover crop and classify such variations into geographic zones or groups. In one embodiment, the controller 126 may be configured to generate a graphically displayed map or visual indicator for display to the operator of the vehicle/implement 10/12 (e.g., via the user interface 134).

In another embodiment, the controller 126 may be configured to determine the density of the cover crop present within the field based on received sensor data. As described above, in one embodiment, the implement 10 and/or the vehicle 12 may include one or more cover crop density sensor(s) 122, with each sensor configured to capture data indicative of the density of the cover crop present within the field. In this regard, as the implement/vehicle 10/12 travel across the field, the controller 126 may be configured to receive the data from the cover crop density sensor(s) 122 (e.g., via the communicative link 132). Thereafter, the controller 126 may be configured to analyze/process the received data to determine the density of the cover crop present within the field, such as within a portion of the field forward of the implement 10. As such, the controller 126 may include a suitable algorithm(s) stored within its memory 130 that, when executed by the processor 128, determines the density of the cover crop present within the field based on the data received from the cover crop density sensor(s) 122.

Furthermore, in embodiments in which the cover crop density is determined as the implement/vehicle 10/12 travels across the field to plant the cash crop, the controller 126 may be configured to generate a field map based on the determined cover crop density values. More specifically, as the implement/vehicle 10/12 travels across the field, the controller 126 may be configured to receive location data (e.g., coordinates) from the location sensor 102 (e.g., via the communicative link 132). Based on the known dimensional configuration and/or relative positioning between the field(s) of view of the cover crop density sensor(s) 122 and the location sensor 102, the controller 126 may be configured to geo-locate each soil cover crop density value within the field. For example, in one embodiment, the coordinates derived from the location sensor 102 and the determined cover crop density values may each be time-stamped. In such an embodiment, the time-stamped data may allow the cover crop density values to be matched or correlated to a corresponding set of location coordinates received or derived from the location sensor 102. Thereafter, the controller 126 may be configured to generate a field map (e.g., a graphical field map) illustrating cover crop density(ies) at various positions within the field. For instance, the controller 126 may be configured to execute one or more algorithms stored within its memory 130 that generate the field map based on the determined cover crop density values and the data received from the location sensor 102. In one embodiment, the controller 126 may be configured to transmit instructions to the user interface 134 (e.g., the communicative link 132) instructing the user interface 134 to display the field map (e.g., a graphical field map).

In accordance with aspects of the present disclosure, the controller 126 may be configured to determine an adjustment(s) to be made to one or more operating parameters of a ground-engaging tool of the seed-planting implement. In general, the density of the cover crop present within the field may affect the operation of one or more ground-engaging tools (e.g., the disc opener(s) 60 or other furrow-forming tool(s), the closing discs 66 or other furrow-closing tool(s), the row-cleaning device(s) 74) of the implement 10. For example, increased cover crop density may result in shallower furrows and/or poor seed-to-soil contact when planting the cash crop. As such, the controller 126 may be configured to determine one or more operating parameter adjustments to be made to one or more ground-engaging tools of the seed-planting implement based on the determined cover crop density.

In one embodiment, the controller 126 may be configured to determine one or more operating parameter adjustments to be made to the gauge wheel(s) and/or the furrow-forming tool(s) of the seed-planting implement based on the determined cover crop density. As described above, the implement 10 may include one or more row unit actuators 104, with each actuator 104 configured to apply a force (e.g., a downward force) to the corresponding row units 44. Such force(s) may, in turn, cause the corresponding gauge wheel(s) 58 to contact the surface of the field and the corresponding disc opener(s) 60 to penetrate the soil in a manner that forms a furrow for the deposition of the cash crop seeds. When the density of the cover crop present within the field increases, it may become more difficult for the disc opener(s) 60 to penetrate the soil to the desired furrow depth. In this regard, when the determined cover crop density increases (e.g., exceeds a predetermined threshold density value), the controller 126 may be configured to determine that the force(s) being applied to the gauge wheel(s) 58 and the disc opener(s) 60 (e.g., via the row unit actuator(s) 104) should be increased. Conversely, when the density of the cover crop present within the field decreases, the disc opener(s) 60 may penetrate the soil to the desired furrow depth. However, in such instances, the gauge wheel(s) 58 may apply excessive pressure to the soil, thereby resulting in soil compaction. As such, when the determined cover crop density decreases (e.g., falls below a predetermined threshold density value), the controller 126 may be configured to determine that the force(s) being applied to the gauge wheel(s) 58 and the disc opener(s) 60 (e.g., via the row unit actuator(s) 104) should be decreased. However, in alternative embodiments, the controller 126 may be configured to determine that any other suitable operating parameter adjustment(s) should be made to the gauge wheel(s) 58 and/or the disc opener(s) 60 or other furrow-forming tool(s) (e.g., a hoe(s)) of the implement 10 based on the determined cover crop density.

Moreover, in another embodiment, the controller 126 may be configured to determine one or more operating parameter adjustments to be made to the furrow-closing tool(s) of the seed-planting implement based on the determined cover crop density. As described above, the implement 10 may include one or more furrow-closing assembly actuators 110, with each actuator 110 configured to apply a force (e.g., a downward force) to the corresponding closing discs 66 such that the closing discs 66 penetrate the soil in a manner that closes the furrow in the soil after the deposition of the cash crop seeds. When the density of the cover crop present within the field increases, it may become more difficult for the closing discs 66 to penetrate the soil to the desired depth to properly close the furrow. In this regard, when the determined cover crop density increases (e.g., exceeds a predetermined threshold density value), the controller 126 may be configured to determine that the force(s) being applied to the closing discs 66 (e.g., via the furrow-closing assembly actuator(s) 110) should be increased. Conversely, when the density of the cover crop present within the field decreases, the penetration depth of the closing discs 66 be too deep to properly close the furrow. As such, when the determined cover crop density decreases (e.g., falls below a predetermined threshold density value), the controller 126 may be configured to determine that the force(s) being applied to the closing discs 66 (e.g., via the furrow-closing assembly actuator(s) 110) should be decreased. However, in alternative embodiments, the controller 126 may be configured to determine that any other suitable operating parameter adjustment(s) should be made to the closing discs 66 or other furrow-closing tool(s) (e.g., a closing wheel(s)) of the implement 10 based on the determined cover crop density.

Additionally, in a further embodiment, the controller 126 may be configured to determine one or more operating parameter adjustments to be made to the row-cleaning device(s) of the seed-planting implement based on the determined cover crop density. As described above, the implement 10 may include one or more row-cleaning device actuators 116, with each actuator 116 configured to apply a force (e.g., a downward force) to the corresponding row-cleaning device 74 such that the row-cleaning device(s) 74 engage the soil in a manner that breaks up and/or sweeps away dirt clods present in the path of the furrow-forming tool(s). When the density of the cover crop present within the field increases, the cover crop may become tangled around the row-cleaning device(s) 74 such that the operation of the row-cleaning device(s) 74 is impeded. In this regard, when the determined cover crop density increases (e.g., exceeds a predetermined threshold density value), the controller 126 may be configured to determine that the force(s) being applied to the row-cleaning device(s) 74 (e.g., via the row-cleaning device actuator(s) 116) should be decreased and/or, in certain instances, the row-cleaning device(s) 74 should be lifted up of off the ground to prevent such tangling. Conversely, when the density of the cover crop present within the field decreases, the row-cleaning device(s) 74 may not engage the soil surface aggressively enough to sufficiently break up and/or sweep away dirt clods in the path of the furrow-forming tool(s). As such, when the determined cover crop density decreases (e.g., falls below a predetermined threshold density value), the controller 126 may be configured to determine that the force(s) being applied to the row-cleaning device(s) 74 (e.g., via the row-cleaning device actuator(s) 116) should be decreased and/or the row-cleaning device(s) 74 should be lowered. However, in alternative embodiments, the controller 126 may be configured to that determine any other suitable operating parameter adjustment(s) should be made to the row-cleaning device(s) 74 of the implement 10 based on the determined cover crop density.

It should be appreciated that, in further embodiments, the operating parameters of any other suitable ground-engaging tool(s) of the implement 10, such as the press wheel 72 and/or a seed firmer (not shown), may be adjusted based on the determined cover crop density.

After the controller 128 has determined the operating parameter adjustment(s) to be made to the ground-engaging tool(s) of the seed-planting implement, the controller 128 may be configured to control the associated actuator(s) to execute such adjustment(s). For example, the controller 128 may be configured to control the operation of the row unit actuator(s) 104 (e.g., by transmitting suitable control signal(s) to an associated control valve(s)) to execute the operating parameter adjustment(s) to the gauge wheel(s) 58 and/or the disc opener(s) 60 of the implement 10. Moreover, the controller 128 may be configured to control the operation of the furrow-closing assembly actuator(s) 110 (e.g., by transmitting suitable control signal(s) to an associated control valve(s)) to execute the operating parameter adjustment(s) to the closing discs 66 of the implement 10. Furthermore, the controller 128 may be configured to control the operation of the row-cleaning device actuator(s) 116 (e.g., by transmitting suitable control signal(s) to an associated control valve(s)) to execute the operating parameter adjustment(s) to the row-cleaning device(s) 74 of the implement 10. In one embodiment, when the operating parameter adjustment(s) correspond to an increase in row-cleaning device aggressiveness, the controller 128 may be configured to control the operation of the row-cleaning device actuator(s) 116 such that the pressure within a first chamber (e.g., one of a cap-side chamber or a rod-side chamber) of the actuators(s) 116 to increase the force being applied to the row-cleaning device(s) 74. Conversely, when the operating parameter adjustment(s) correspond to an decrease in row-cleaning device aggressiveness, the controller 128 may be configured to control the operation of the row-cleaning device actuator(s) 116 such that the pressure within a second chamber (e.g., the other of the cap-side chamber or the rod-side chamber) of the actuators(s) 116 to increase the force being applied to the row-cleaning device(s) 74. However, in alternative embodiments, the controller 126 may be configured to control the operation of any other suitable actuator(s) of the implement 10 and/or the vehicle 12 to execute the operating parameter adjustment(s) to be made to the ground-engaging tool(s) of the implement 10.

In addition, the controller 126 may be configured to adjust the ground speed at which the implement/vehicle 10/12 is traveling across the field based on the determined cover crop density. For example, when the density of the cover crop present within the field increases, it may be desirable to slow the ground speed of the implement/vehicle 10/12. In this regard, when the determined cover crop density increases (e.g., exceeds a predetermined threshold density value), the controller 126 may be configured to control the operation of the engine 22 and/or the transmission 24 to slow the ground speed of the implement/vehicle 10/12. Conversely, when the density of the cover crop present within the field decreases, it may be desirable to increase the ground speed of the implement/vehicle 10/12. In this regard, when the determined cover crop density decreases (e.g., falls below a predetermined threshold density value), the controller 126 may be configured to control the operation of the engine 22 and/or the transmission 24 to increase the ground speed of the implement/vehicle 10/12. However, in alternative embodiment, the controller 126 may be configured to adjust the ground speed of the implement/vehicle 10/12 in any other suitable manner based on the cover crop density.

Figure 5:
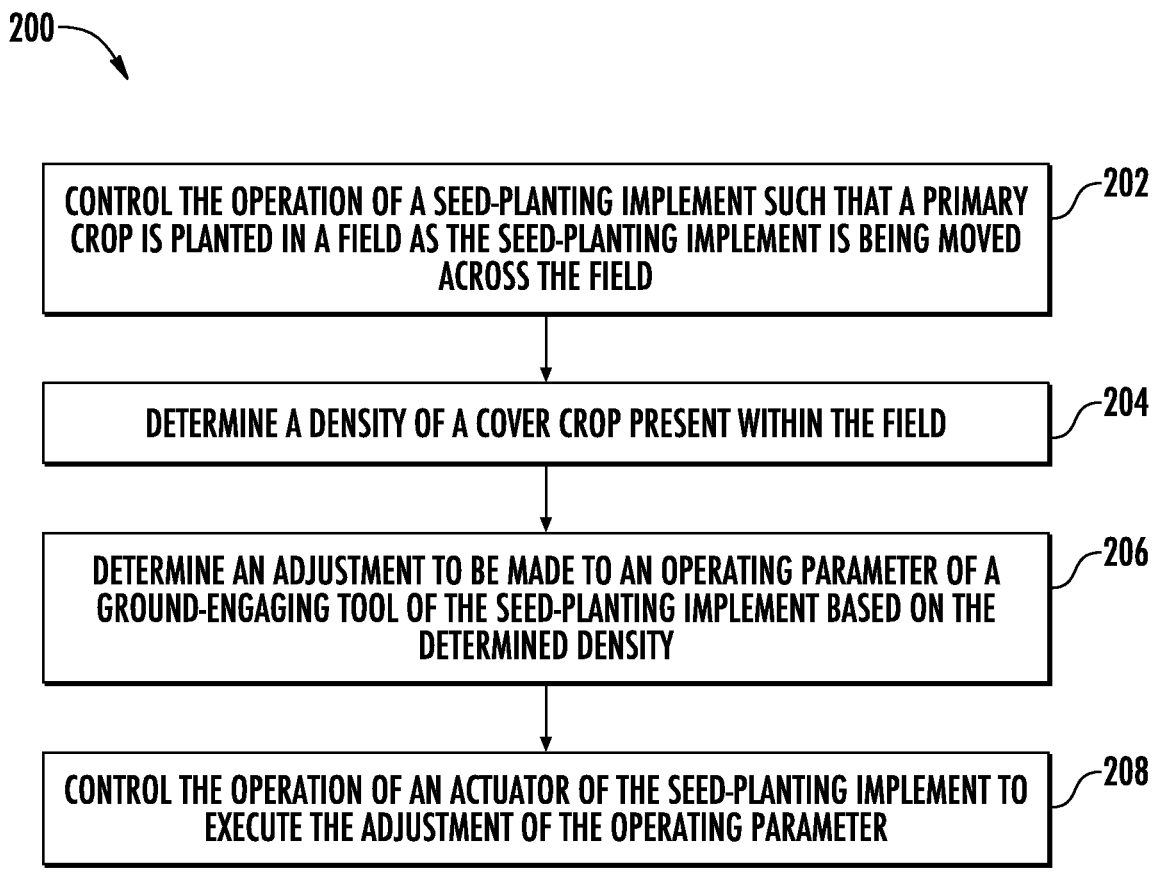
FIG. 5 illustrates a flow diagram of one embodiment of a method for controlling the operation of a seed-planting implement in accordance with aspects of the present subject matter Repeat use of reference characters in the present specification and drawings is intended to represent the same or analogous features or elements of the present technology.

Referring now to FIG. 5, a flow diagram of one embodiment of a method 200 for controlling the operation of a seed-planting implement is illustrated in accordance with aspects of the present subject matter. In general, the method 200 will be described herein with reference to the seed-planting implement 10, the work vehicle 12, and the system 100 described above with reference to FIGS. 1-4. However, it should be appreciated by those of ordinary skill in the art that the disclosed method 200 may generally be implemented with any seed-planting implement having any suitable implement configuration, any work vehicle having any suitable vehicle configuration, and/or any system having any suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (202), the method 200 may include controlling, with one or more computing devices, the operation of a seed-planting implement such that a primary crop is planted in a field as the seed-planting implement is being moved across the field. For instance, as described above, the controller 126 may be configured to control the operation of one or more components of the seed-planting implement 10 such that a primary or cash crop (e.g., corn, soybeans, and/or the like) is planted in a field in which a cover crop (e.g., grasses, brassicas, legumes, and/or the like) is present as the implement 10 is being moved across the field.

Additionally, at (204), the method 200 may include determining, with the one or more computing devices, a density of a cover crop present within the field. For instance, as described above, the controller 126 may be configured to determine the density of the cover crop present within the field based on, e.g., a stored field map and/or received sensor data.

Moreover, as shown in FIG. 5, at (206), the method 200 may include determining, with the one or more computing devices, an adjustment to be made to an operating parameter of a ground-engaging tool of the seed-planting implement based on the determined density. For instance, as described above, the controller 126 may be configured to determine one or more operating parameter adjustments to be made to one or more ground-engaging tools (e.g., the gauge wheel(s) 58, the disc opener(s) 60, and/or the closing disc(s) 66) of the implement 10 based on the determined density.

Furthermore, at (208), the method 200 may include controlling, with the one or more computing devices, the operation of an actuator of the seed-planting implement to execute the adjustment of the operating parameter. For instance, as described above, the controller 126 may be configured to control the operation of one or more actuators (e.g., one or more of the actuators 104, 110, 116) of the implement 10 to execute the adjustment(s) of the operating parameter(s).

It is to be understood that the steps of the method 200 are performed by the controller 126 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 126 described herein, such as the method 200, is implemented in software code or instructions which are tangibly stored on a tangible computer readable medium. The controller 126 loads the software code or instructions via a direct interface with the computer readable medium or via a wired and/or wireless network. Upon loading and executing such software code or instructions by the controller 126, the controller 126 may perform any of the functionality of the controller 126 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for controlling the operation of a seed-planting implement, the system comprising:
   a ground-engaging tool configured to contact soil present within a field across which the seed-planting implement is being moved;
   an actuator configured to adjust an operating parameter of the ground-engaging tool; and
   a controller configured to:
      control the operation of the seed-planting implement such that a primary crop is planted in the field as the seed-planting implement is being moved across the field;
      determine a number of living cover crop plants present within a given area of the field;
      determine an adjustment to be made to the operating parameter of the ground-engaging tool based on the determined number of the living cover crop plants; and
      control the operation of the actuator to execute the adjustment of the operating parameter.

2. The system of claim 1, wherein the controller is further configured to:
   access a field map indicative of the number of the living cover crop plants present within the given area of the field; and
   determine the number of the living cover crop plants present within the given area of the field based on the accessed field map as the seed-planting implement is moved across the field.

3. The system of claim 2, wherein the field map comprises a field map generated based on data collected during a previous agricultural operation.

4. The system of claim 1, wherein the ground-engaging tool comprises at least one of gauge wheel or a furrow-forming tool and the operating parameter comprises a force being applied to the at least one of the gauge wheel or the furrow-forming tool.

5. The system of claim 1, wherein the ground-engaging tool comprises a row-cleaning device and the operating parameter comprises at least one of a force being applied to or a position of the row-cleaning device.

6. The system of claim 1, wherein the ground-engaging tool comprises a furrow-closing tool and the operating parameter comprises a force being applied to the furrow-closing tool.

7. The system of claim 1, wherein the controller is further configured to initiate an adjustment to a ground speed at which the seed-planting implement is being moved across the field based on the determined number of living cover crop plants.

8. The system of claim 1, further comprising:
a sensor configured to capture data indicative of the number of the living cover crop plants present within the given area of the field as the seed-planting implement is being moved across the field, the controller being communicatively coupled to the sensor, the controller further configured to:
receive the captured data indicative of the number of the living cover crop plants present within the given area of the field from the sensor; and
determine the number of the living cover crop plants present within the given area of the field based on the received data.

9. The system of claim 8, wherein the sensor has a field of view directed in front of the seed-planting implement relative to a direction of travel of the seed-planting implement.

10. The system of claim 8, wherein the controller is further configured to generate a field map based on the determined number of the living cover crop plants.

11. The system of claim 1, wherein the living cover crop comprises at least one of a grass, a legume, or a *brassica*.

12. A method for controlling the operation of a seed-planting implement, the seed-planting implement including a ground-engaging tool and an actuator configured to adjust an operating parameter of the ground-engaging tool, the method comprising:
controlling, with one or more computing devices, the operation of the seed-planting implement such that a primary crop is planted in a field as the seed-planting implement is being moved across the field;
determining, with one or more the computing devices, a number of all living cover crop plants present within a given area of the field;
determining, with the one or more computing devices, an adjustment to be made to the operating parameter of the ground-engaging tool based on the determined number of the living cover crop plants; and
controlling, with the one or more computing devices, the operation of the actuator to execute the adjustment of the operating parameter.

13. The method of claim 12, further comprising:
accessing, with the one of more computing devices, a field map indicative of the number of the living cover crop plants present within a given area of the field, wherein determining the number of the living cover crop plants comprises determining, with the one or more computing devices, the number of the living cover crop plants present within the given area of the field based on the accessed field map.

14. The method of claim 13, wherein the field map comprises a field map generated based on data collected during a previous agricultural operation.

15. The method of claim 12, wherein the ground-engaging tool comprises at least one of gauge wheel or a furrow-forming tool and the operating parameter comprises a force being applied to the at least one of the gauge wheel or the furrow-forming tool.

16. The method of claim 12, wherein the ground-engaging tool comprises a row-cleaning device and the operating parameter comprises at least one of a force being applied to or a position of the row-cleaning device.

17. The method of claim 12, wherein the ground-engaging tool comprises a furrow-closing tool and the operating parameter comprises a force being applied to the furrow-closing tool.

18. The method of claim 12, further comprising:
initiating, with the one or more computing devices, an adjustment to a ground speed at which the seed-planting implement is being moved across the field based on the determined number of living cover crop plants.

19. The method of claim 12, further comprising:
receiving, with the one or more computing devices, captured sensor data indicative of the number of the living cover crop plants present within the given area of the field, wherein determining the number of the living cover crop plants comprises determining, with the one or more computing devices, the number of the living cover crop plants present within the given area of the field based on the received sensor data.

20. The method of claim 19, further comprising:
generating, with the one or more computing devices, a field map based on the determined number of the living cover crop plants.

* * * * *